United States Patent [19]

Hsi-Chou

[11] Patent Number: 4,974,511
[45] Date of Patent: Dec. 4, 1990

[54] PORTABLE GYROSCOPIC GOLF BALL CENTERPLANE MARKING DEVICE

[76] Inventor: Huang Hsi-Chou, No. 66, Fu Wei St., Tainan, Taiwan

[21] Appl. No.: 519,742

[22] Filed: May 7, 1990

[51] Int. Cl.⁵ ............................................. B41F 17/08
[52] U.S. Cl. ........................... 101/38.1; 101/DIG. 40
[58] Field of Search .......... 101/36, 38.1, 41, DIG. 40, 101/4

[56] References Cited

U.S. PATENT DOCUMENTS

| | | | |
|---|---|---|---|
| 1,045,340 | 11/1912 | Supplee | 101/DIG. 40 |
| 1,527,691 | 2/1925 | McNab et al. | 101/DIG. 40 |
| 1,963,494 | 6/1934 | Humphrey | 101/38.1 |
| 1,999,647 | 4/1935 | Atti | 101/DIG. 40 |
| 4,086,851 | 5/1978 | Brandell | 101/4 |
| 4,441,716 | 4/1984 | Chen | 101/DIG. 40 |
| 4,803,922 | 2/1989 | Dennesen | 101/DIG. 40 |

Primary Examiner—Eugene H. Eickholt
Attorney, Agent, or Firm—Zarley, McKee, Thomte, Voorhees & Sease

[57] ABSTRACT

A device consisting of a housing, an electrical motor and an activation switch. The housing is cylindrical and basically hollow, with a battery compartment located at its lower end and an arched cover at its upper end. The arched cover has a semi-circular marking slot on it. The arched cover fits frictionally on the upper part of the housing. The electric motor has a driving shaft on its upper end which drives a rotor dish to rotate. The activation switch is electrically connected to the electric motor to activate or deactivate the rotor dish.

2 Claims, 5 Drawing Sheets

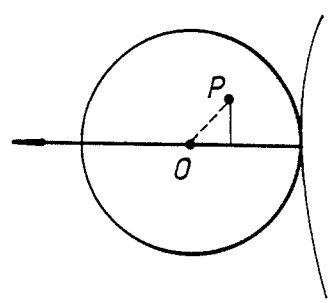
F I G. 6

PORTABLE GYROSCOPIC GOLF BALL CENTERPLANE MARKING DEVICE

BACKGROUND OF THE INVENTION

The present invention relates generally to centrifugal devices, and in particular relates to a centrifugal centerplane marking device for marking golf balls.

Presently, there are at least three different types of golf balls on the market, as seen in FIG. 3A through FIG. 3C. Of course, if all of these three types of golf balls were perfectly uniform in consistency and if the cores therein were perfectly centered, then every golf ball's center of gravity would be exactly in the centerpoint of the golf ball. In reality, however, golf balls are not perfectly uniform in consistency. Furthermore, in golf balls having one or more cores, the core (or cores) are often slightly off center, meaning that the center of gravity of the golf ball is not necessarily the centerpoint of the golf ball, as illustrated in FIG. 6. Each core has its own center of gravity (B) and the outer shell has its own center of gravity (A), as illustrated in FIG. 4 and 5. If the center of gravity of the golf ball does not happen to be the exact centerpoint of the golf ball, then even if the golfer hit the golf ball perfectly squarely, the ball would still not fly in the exact direction intended by the golfer.

SUMMARY OF THE INVENTION

It is a primary objective of the present invention to provide a gyroscopic centerplane marking device which can be used by the average golfer for marking the centerplane of normal golf balls.

It is another objective of the present invention to provide such a gyroscopic centerplane marking device which is portable.

It is still another objective of the present invention to provide such a gyroscopic centerplane marking device which is durable and inexpensive.

Further objectives and advantages of the present invention will become apparent as the following description proceeds, and the features of novelty which characterize the invention will be pointed out with particularity in the claims annexed to and forming a part of this invention.

These and additional objects, if not set forth specifically herein, will be readily apparent to those skilled in the art from the detailed description provided hereinbelow, with appropriate reference to the accompanying drawings.

BRIEF DESCRIPTION OF THE DRAWINGS

FIG. 6 is a schematic representation of a golf ball with an eccentric center of gravity in relation to the golfer's club at the time of contact.

DETAILED DESCRIPTION OF THE PREFERRED EMBODIMENT

Figure 1:
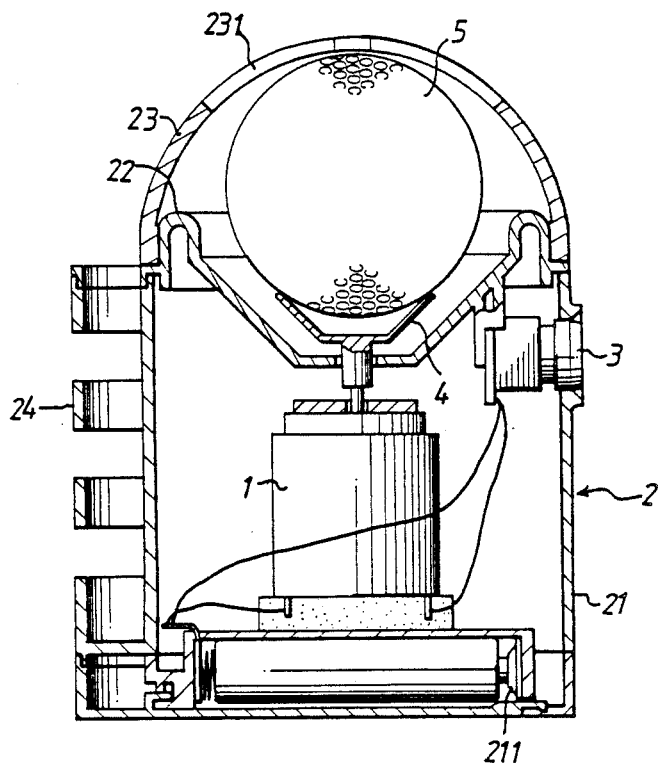
FIG. 1 is a cutaway view of the gyroscopic golf ball centerplane marking device of the present invention.
Figure 2:
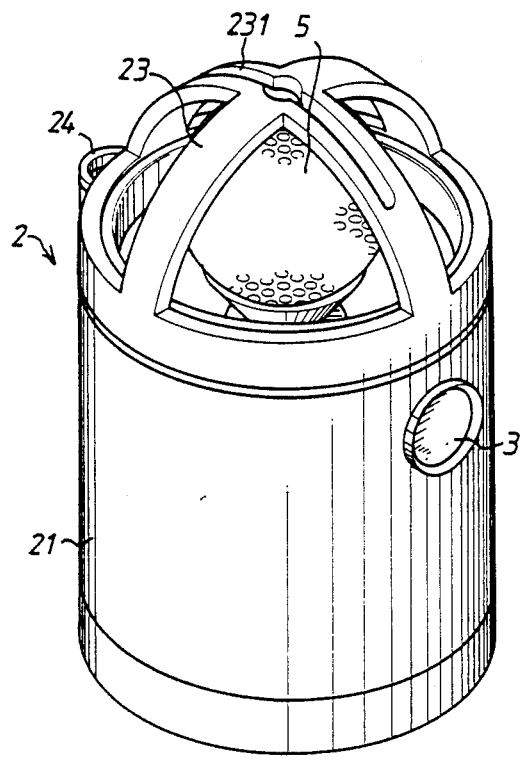
FIG. 2 is a perspective view of the gyroscopic golf ball centerplane marking device of FIG. 1.
Figure 3A:
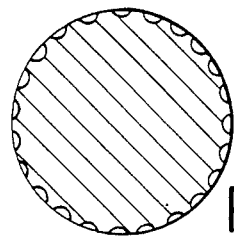
FIG. 3A through 3C are cutaway views of single, double, and triple core golf balls, respectively.
Figure 3B:
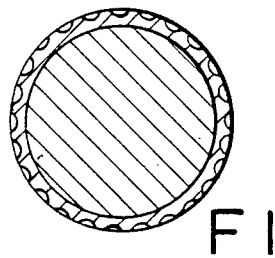
Figure 3C:
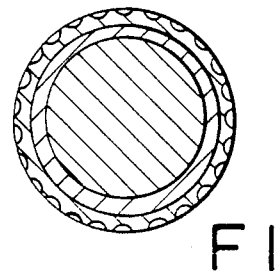
Figure 4:
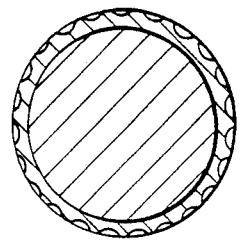
FIG. 4 is a cross-sectional view of a two (double) core golf ball in which the centers of gravity of the two cores are at different points.
Figure 5:
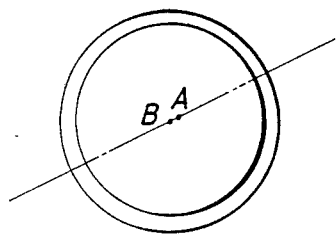
FIG. 5 is a schematic representation of FIG. 4, showing the two different centers of gravity in relation to the circumference of the first and second core.

With reference to FIGS. 1 and 2, and in particular with reference to FIG. 1, it can be seen that the portable gyroscopic golf ball centerplane marking device of the present invention comprises a housing 2, a battery driven electric motor 1, and an activation switch 3.

The housing 2 includes a substantially cylindrical portion 21, a stabilizing dish 22 fixed at the upper end of the cylindrical portion 21, and an arched cover 23 which frictionally fits on the upper end of the stabilizing dish 22. The arched cover 23 consists of two intersecting semi-circular bands, or pieces, with one of the bands having a substantially semi-circular marking slot 231 on it. The cylindrical portion 21 has a battery compartment 211 at its lower end for receiving dry cell batteries to power the electric motor 1.

A driving shaft 11 protrudes from an upper end of the electric motor 1, which is centrally fixed in the cylindrical portion 21 on top of said battery compartment 211. A rotor dish 11 is fixed on said driving shaft 11 so as to be rotated by the driving shaft 11 when said electric motor 1 is activated. The lower portion of said rotor dish 4 is rotatably secured by said stabilizing dish 22 so as to prevent wobbling thereof.

At an upper end of the cylindrical portion, an activation switch 3 is fixed. This activation switch 3 is electrically connected to said electric motor 1 so as to activate or deactivate said electric motor 1 when pressed by the user.

Now the operation of the portable gyroscopic golf ball centerplane marking device will be explained. First, the user removes the arched cover 23 of the housing 2. Next, the user places a golf ball 5 on the rotor dish 4 and then the user puts the arched cover 23 back on the stabilizing dish 22, rotatably securing the golf ball between the upper portion of the arched cover 23 and the rotor dish 4. The user then pushes the activation switch 3 so as to activate the electric motor 1, which drives the rotor dish 4. As the golf ball is rotated, it will eventually move to a stable, albeit dynamic configuration. At this point, the user simply uses a pencil or some similar marking device to mark the ceterplane of the golf ball. After marking the centerplane, the activation switch is pressed for the second time, thereby deactivating the electric motor 1 and hence the rotor dish 4. When the golf ball 5 has stopped spinning, the user removes the arched cover 23 and the golf ball 5.

For added convenience to the user, the housing 2 includes a pencil holder 24 on the cylindrical portion 21 thereof, with said pencil holder 24 being vertically aligned on the outer surface of said cylindrical portion 21.

While the present invention has been explained in relation to its preferred embodiment, it is to be understood that various modifications thereof will be apparent to those skilled in the art upon reading this specification. For example, the arched cover 23 could be semi-spherical in shape rather than two arched sections as shown in FIG. 2. Therefore, it is to be understood that the invention disclosed herein is intended to cover all such mofidications as shall fall within the scope of the appended claims.

I claim:

1. A portable gyroscopic golf ball centerplane marking device comprising:

(a) a housing (2) comprising a cylindrical portion (21), a stabilizing dish (22) and an arched cover (23), said arched cover frictionally fitting on an uper end of said cylindrical portion (21), said cylindrical housing (2) having a battery compartment (211) at a lower end thereof for receiving batteries therein, said arched cover (23) having a substantially semi-circular marking slot (231) thereof;

(b) a battery-driven electric motor (1) having a driving shaft (11) protruding from an upper end thereof, said electric motor (1) being centrally fixed in said cylindrical portion (21) with a rotor dish (4) being fixed on said driving shaft (11) so as to be rotated by said driving shaft (11) when said electric motor (1) is activated, a lower portion of said rotor dish (4) being rotatably secured by said stabilizing dish (22) so as to prevent wobbling thereof; and (c) and activation switch (3) being fixed at an upper part of said portion (21), said activation switch (3) being connected to said electric motor (1) so as to activate or deactivate said electric motor (1) when pressed by a user.

2. A gyroscopic centerplane marking device as set forth in claim 1, wherein said portion (21) has a pencil holder (24) being vertically aligned on a outer wall thereof.

* * * * *

UNITED STATES PATENT AND TRADEMARK OFFICE
CERTIFICATE OF CORRECTION

PATENT NO. : 4,974,511

DATED : December 4, 1990

INVENTOR(S) : HUANG Hsi-Chou

It is certified that error appears in the above-identified patent and that said Letters Patent is hereby corrected as shown below:

Column 1, line [19], delete "Hsi-Chou" and substitute --HUANG--.

Column 1, line [76], delete "Huang Hsi-Chou" and substitute --HUANG Hsi-Chou--.

Signed and Sealed this

Twenty-first Day of April, 1992

Attest:

HARRY F. MANBECK, JR.

Attesting Officer     Commissioner of Patents and Trademarks